(12) United States Patent
McLarty et al.

(10) Patent No.: US 11,594,738 B2
(45) Date of Patent: Feb. 28, 2023

(54) FUEL CELL AND ELECTROLYZER HOTBOX MODULE USING CONDUCTIVE ZIRCONIA STACKS

(71) Applicant: Washington State University, Pullman, WA (US)

(72) Inventors: Dustin McLarty, Pullman, WA (US); John Drazin, Pullman, WA (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 16/937,271

(22) Filed: Jul. 23, 2020

(65) Prior Publication Data
US 2021/0098796 A1    Apr. 1, 2021

Related U.S. Application Data

(60) Provisional application No. 62/908,835, filed on Oct. 1, 2019.

(51) Int. Cl.
| | |
|---|---|
| *H01M 4/90* | (2006.01) |
| *H01M 4/86* | (2006.01) |
| *H01M 4/88* | (2006.01) |
| *H01M 8/1213* | (2016.01) |
| *H01M 8/2425* | (2016.01) |
| *H01M 8/1253* | (2016.01) |
| *H01M 8/04089* | (2016.01) |
| *H01M 8/12* | (2016.01) |

(52) U.S. Cl.
CPC ....... *H01M 4/9066* (2013.01); *H01M 4/8657* (2013.01); *H01M 4/8885* (2013.01); *H01M 4/9025* (2013.01); *H01M 8/04089* (2013.01); *H01M 8/1213* (2013.01); *H01M 8/1253* (2013.01); *H01M 8/2425* (2013.01); *H01M 2008/1293* (2013.01)

(58) Field of Classification Search
None
See application file for complete search history.

(56) References Cited

U.S. PATENT DOCUMENTS

| | | | |
|---|---|---|---|
| 10,601,073 B2 * | 3/2020 | Yoshioka | H01B 1/08 |
| 2020/0115288 A1 * | 4/2020 | Boccard | C04B 35/62884 |

FOREIGN PATENT DOCUMENTS

CN    106927819 A  *  7/2017

OTHER PUBLICATIONS

CN-106927819-A (Year: 2017); machine translation.*
Chen. "Investigation of reactions between vanadium oxide and plasma-sprayed yttria-stabilized zirconia coatings" (Year: 2008).*

(Continued)

*Primary Examiner* — Haroon S. Sheikh
(74) *Attorney, Agent, or Firm* — Klarquist Sparkman, LLP

(57) ABSTRACT

Modular pressurized hotbox for use and substitution in a variety of pressurized electrochemical applications to include reversible solid oxide electrolyzer and fuel cells, energy storage systems, renewable fuel production, solid-state hydrogen pumping and liquefaction, and oxygen transport membranes. This is enabled by mixed electronic and ionic conducting compositions of vanadia-yttria and vanadia-calcia stabilized zirconia and a dry powder method of manufacture for ceramic core stacks.

11 Claims, 14 Drawing Sheets

(56) References Cited

OTHER PUBLICATIONS

Susnitzky. "Vanadia-induced transformations in yttria-stabilized zirconia" (Year: 1988).*
Hertl. "Vanadia reactions with yttria stabilized zirconia" (Year: 1988).*
Mayoral. "Yttria stabilized zirconia corrosion destabilization followed by Raman mapping" (Year: 2008).*

* cited by examiner

FIG. 3A
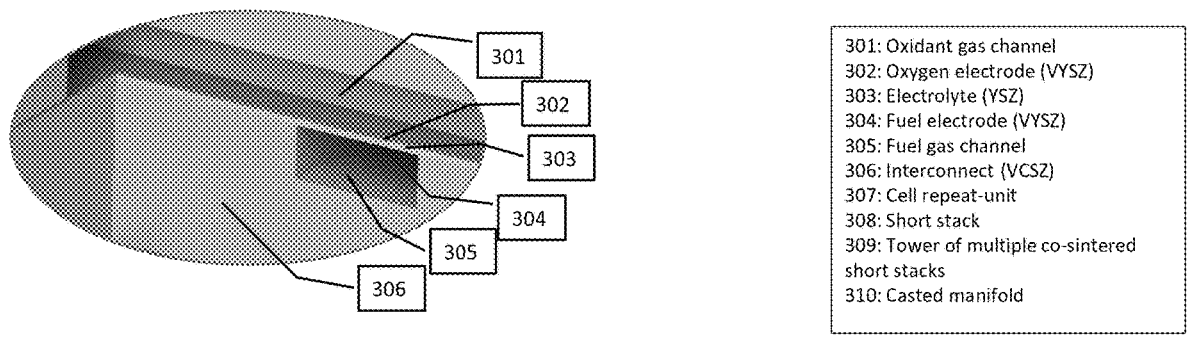
301: Oxidant gas channel
302: Oxygen electrode (VYSZ)
303: Electrolyte (YSZ)
304: Fuel electrode (VYSZ)
305: Fuel gas channel
306: Interconnect (VCSZ)
307: Cell repeat-unit
308: Short stack
309: Tower of multiple co-sintered short stacks
310: Casted manifold
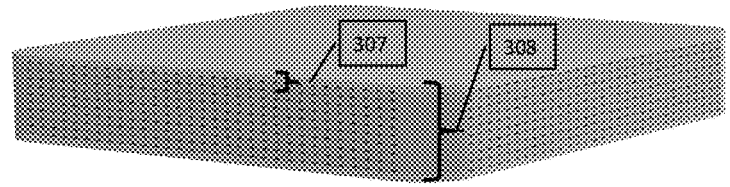
FIG. 3B
FIG. 3C
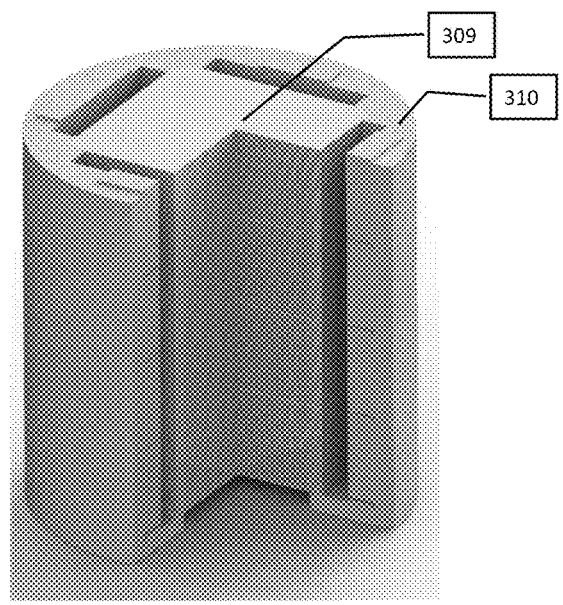

FUEL CELL AND ELECTROLYZER HOTBOX MODULE USING CONDUCTIVE ZIRCONIA STACKS

CROSS REFERENCE TO RELATED APPLICATION

This application claims the benefit of U.S. Provisional Appl. No. 62/908,835, filed Oct. 1, 2019, which is incorporated herein by reference.

ACKNOWLEDGMENT OF GOVERNMENT SUPPORT

This invention was made with government support under Grant No. DE-AR0000960 awarded by the United States Department of Energy. The government has certain rights in the invention.

FIELD

This relates to the use and manufacture of mixed electronic and ionic conductor (MEIC) material—doped yttria stabilized zirconia (YSZ)—in reversible solid oxide fuel cells (SOFC), solid oxide electrolyzing cells (SOEC), and oxygen separation membranes (OSM).

BACKGROUND

Applications of MEIC include separation membranes and electrodes for power production, electrolysis, and solid-state pumping. A small number of lanthanide perovskite ceramic materials have been identified as suitable MEICs for cathode electrodes in SOFCs due to their high conductivity and stability in oxidizing environments. SOFCs directly convert chemical energy from hydrogen, natural gas, or liquid hydrocarbon fuels into electrical work through solid-state electrochemistry. FIG. 1 outlines the basic principles of operation with two MEIC's sandwiching an ionic conductor. The oxygen ion conducting electrolyte, commonly YSZ, prevents electron flow, directing the electrons through an external electrical circuit to perform work. The cathode catalyzes the oxygen gas splitting so it can conduct via the electrolyte to the anode. The anode catalyzes the fuel oxidation reaction and conducts the electrons to the electrical circuit. The difference in chemical potentials between the electrons in the cathode and anode side (after chemical reaction) results in an electrical voltage that can perform work. In SOECs, the pathway of electrons and ions is reversed, using electricity to split steam into component hydrogen and oxygen.

Efficient oxygen conducting cells require a thin non-porous layer to facilitate ionic diffusion surrounded by electrodes and gas channels. Individual cells are stacked using metallic interconnects which conduct electrons and route the fuel and oxidant gases across the SOFC surface. Current production technologies include extrusion or tape-casting, followed by screen printing or thermal spraying. Additive manufacturing with ink-jet printers has also been attempted. Use of metal components in the SOFC stack has drawbacks. Chrome which gives steel stability at high operating temperatures (650 C to 750 C) forms a chromia layer on the cathode that is highly electrically resistive and dramatically increases the area specific resistance (ASR) of the cell. Nickel in the anode is poisoned by sulfur compounds common in natural gas and liquid hydrocarbon fuels. Despite these problems, the SOFC community continues to use metal for interconnects because it is the lowest cost material that can conduct electrons and not oxygen ions in both reducing and oxidizing gaseous environments. The SOFC community has invested considerable time and money into chemical coatings that delay or minimize chrome poisoning while simultaneously not affecting the chemistry of the cathode materials.

Alternatives to YSZ electrolytes that exhibit sufficient oxygen ion conduction, typically lack mechanical strength or chemical stability in either oxidizing or reducing gaseous environments, and thus require specialized barrier layers. Oxygen conducting perovskites, cubic fluorite cerias, Brownmillerite-structured oxide ion conductors, and layered aurivillius-structured compounds have all been examined for fuel cell applications. Lanthanide perovskites effectively catalyze the oxygen gas splitting, but don't survive in reducing environments, and in electrolysis operation these cathodes delaminate from the defect cubic structure of the YSZ electrolyte. Ni-YSZ cermet (metal-ceramic composite) commonly used in SOFC anodes adheres well to the YSZ electrolyte but oxidizes quickly in a non-reducing environment. Special care must be taken to manage start-up and shut down to avoid oxidizing this anode. Additionally, the nickel forms NiS (sulfide) and evaporates when exposed to fuels containing ppm levels of $H_2S$. Carbon cokes easily on the nickel's surface in an oxygen deficient fuel reaction, requiring systems to recirculate additional steam through the anode chamber. The carbon coking can be reversed with excess water and slight amount of oxygen flow in the anode side while the sulfur poisoning is irreversible.

Solutions to individual issues commonly exacerbate other problems or create altogether new dilemmas. For example, a ceria bond coat added prior to cathode layer deposition minimizes delamination by effectively bonding to both the cubic zirconia and the cathode perovskite, but the ceria coating includes a rare and expensive element and increases contact resistance. Molybdenum similarly addresses the coking and sulfur intolerance of the anode while increasing material cost and contact resistance.

Individual manufactures differ, but Ni-YSZ/YSZ/LSM cells with stainless steel (SS) interconnects have become the most common within the SOFC community. Various chemistry improvements enhance durability or initial performance, but none address the challenges of pressurization in future SOFC development. Pressurization increases the coking and sulfur degradation rate and increases delaminating of the cathode. Most development work attempts to improve SOFC/SOEC performance with the same component materials: varying cell production methods, stacking arrangements, and balance-of-plant control systems to collectively manage fundamental material issues.

Tape casting produces uniformly thin sheets of support material, either electrolyte or anode, that can be cut to desired cell sizes and shapes. The remaining layers are deposited onto this support layer prior to co-sintering of the cell. Tape casting produces single cells that require metal interconnects to electrically bridge the cells. Warpage of the cell after sintering, caused by drastically different theoretical densities of the dissimilar layers, is a common challenge that limits the scale-up. Warpage can cause mechanical failures and increases the difficulty and expense of sealing.

Screen printing is commonly employed to deposit either a thin electrolyte or electrode layer. Ink is transferred onto a substrate using a blade to scrape the ceramic ink over an open mesh. A thin, single layer can be printed with intricate aerial patterns. The ink has to dry and the ink polymer burnt out prior to deposition of the next layer. Thermal spraying differs slightly from screen printing. It is a continuous process, similar to tape casting and different from the batch processing of screen printing. A heated stream of pure ceramic powder is accelerated at high velocities and temperatures (plasmas) and embedded onto the substrate. The ceramic layers can be between 10s of microns to a few mm Thermal spraying has a fast deposition rate, but stacking multiple layers is not advised as there is a high chance of material diffusion that could compromise a thin gas tight electrolyte layer. These production techniques are best suited for wide area thin cells with external and expensive gas manifolding and electrical bridging.

SUMMARY

Disclosed herein is a hotbox device comprising:
a core ceramic stack comprising a plurality of yttria-stabilized zirconia electrolyte layers, interleaved with a plurality of mixed electronic and ionic conductor electrodes, and a plurality of mixed electronic and ionic conductor interconnects, wherein the mixed electronic and ionic conductor is a cubic defect structured ceramic;
a gas manifold containing the core ceramic stack;
a heat exchanger coupled to the core ceramic stack;
a pressure vessel containing the gas manifold, the core ceramic stack, and heat exchanger; and
a plurality of conduits through the pressure vessel comprising a plurality of insulated electrical connections and a plurality of passages for one or more of the group including fuel, gas, and instrumentation.

Also disclosed herein is a composition comprising a zirconia doped with vanadia and yttria, wherein the composition is a mixed electronic and ionic conductor.

Further disclosed herein is a composition comprising a zirconia doped with vanadia and calcia, wherein the composition is a mixed electronic and ionic conductor.

Additionally disclosed herein is a device comprising a plurality of adjacent repeat units, each repeat unit comprising:
  a first interconnect;
  a first electrode adjacent to the first interconnect, wherein the first electrode comprises vanadia-yttria stabilized zirconia;
  an electrolyte adjacent of the first electrode;
  a second electrode adjacent to the electrolyte, wherein the second electrode comprises vanadia-yttria stabilized zirconia; and
  a second interconnect adjacent to the second electrode.

Also disclosed herein is a method for fabricating a fuel cell stack, comprising:
  (a) first pressing ceramic powder in a plurality of successive layers of interconnects, anodes, electrolytes, and cathodes, wherein at least the anodes and the cathodes comprise a mixed electronic and ionic conductor and the interconnects include an embedded burnout material resulting in a stack;
  (b) second pressing the stack; and
  (c) sintering the stack.

Further disclosed herein is a method for fabricating a fuel cell stack, comprising:
  (a) pressing ceramic powder resulting in at least one layer selected from an interconnect, an anode comprised of a mixed electronic and ionic conductor, an electrolyte, or a cathode comprised of a mixed electronic and ionic conductor, wherein a burnout material is embedded in the interconnect;
  (b) repeating step (a) a plurality of times resulting in a stack of a plurality of successive layers;
  (c) pressing the resulting stack; and
  (d) sintering the resulting pressed stack thereby burning away the burnout material and resulting in a fuel cell stack.

Also disclosed herein is a method for fabricating a heat exchanger stack, comprising:
  (a) first pressing ceramic powder in a plurality of layers interleaved with a plurality of layers of burnout material;
  (b) second pressing the stack; and
  (c) sintering the stack.

Additionally, disclosed herein is a method for fabricating a partial-pressure oxygen separator stack, comprising:
  (a) first pressing a mixed electronic and ionic conductor ceramic powder in a plurality of layers interleaved with a plurality of layers of burnout material;
  (b) second pressing the stack; and
  (c) sintering the stack.

The foregoing and other objects, features, will become more apparent from the following detailed description, which proceeds with reference to the accompanying figures.

BRIEF DESCRIPTION OF THE DRAWINGS

FIGS. 3A-3C shows details of ceramic stacks. FIG. 3A illustrates the 6 micron anode/electrolyte/cathode layers between the 400 micron interconnect gas routing layers. FIG. 3B shows a short stack of adjacent cell repeat units. FIG. 3C is a rendering of a 120 repeat-unit monolithic stack surrounded by cast ceramic gas manifold.

DETAILED DESCRIPTION

Figure 1:
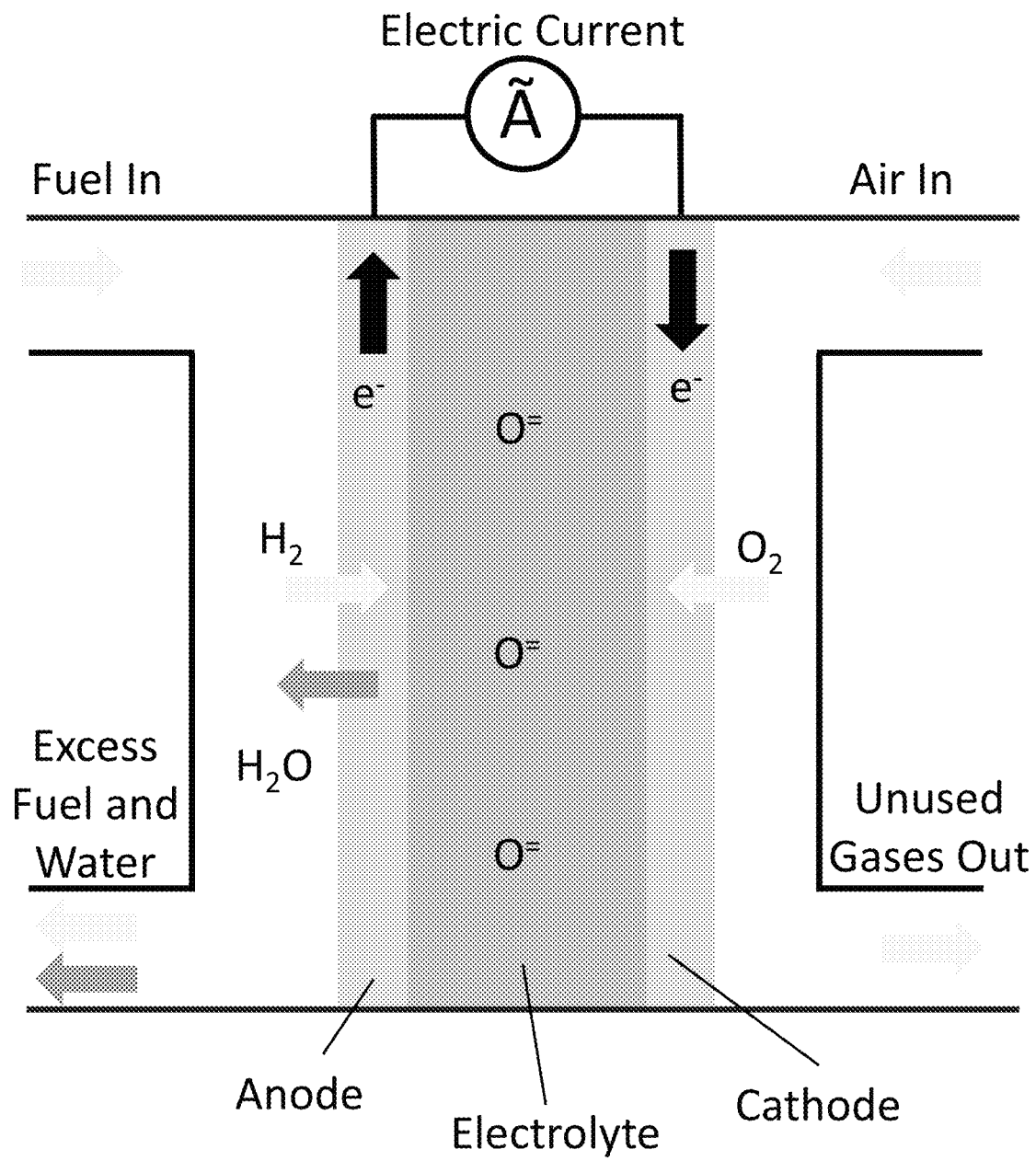
FIG. 1 is a schematic of an oxygen conducting fuel cell which commonly employs a lanthanide perovskite based ceramic cathode, a yttria doped zirconia electrolyte, and a Ni-YSZ cermet anode. Air flows over the cathode which splits the oxygen gas into ions which are conducted across the electrolyte to oxidize the fuel at the anode. The thermodynamic potential differences between the electrons in the anode and cathode states results in an overall electrical voltage which can be harnessed to perform work.

In the description of the invention herein, a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, the figures, as shown herein, are not necessarily drawn to scale, wherein some of the elements may be drawn merely for clarity of the invention. Additionally, any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Electrically conducting variants of cubic zirconia stable across a wide temperature range address fundamental material incompatibilities underlying the electrode and electrode/electrolyte interface challenges in reversible SOFC/SOECs. Compositions here include vanadia-yttria stabilized zirconia (VYSZ) and vanadia-calcia stabilized zirconia (VCSZ). VYSZ is highly electrically and ionically conductive and suitable for electrode material, and VCSZ is primarily electrically conductive for use as a lower cost interconnect material. In certain embodiments, VYSZ be used as both the anode and the cathode for a single SOFC microcell. Both compositions can be synthesized as ultra-fine nano-powders, 20-25 nanometers average particle size.

Such a fundamental shift in component materials and chemistry requires revisiting known production techniques, stack design, and balance-of-plant. Substituting temperature-stable cubic structured zirconia-based MEIC material for metals in existing production systems results in little improvement in overall system performance. However, this change enables a new method of SOFC/SOEC manufacture and corresponding new cell designs, using dry powder processing to make vertically structured ceramic stacks with alternating direction microchannels. Unconstrained by inherent problems of metallic interconnects, pressurized operation allows these microchannels to supply sufficient oxidant and fuel.

These materials, manufacturing, and system design changes result in a reversible hotbox module with exceptional performance.

A. Material Synthesis

Described herein are novel compositions of mixed conducting cubic stabilized zirconia fabricated as nanograined powders: Vanadia-Yttria stabilized Zirconia (VYSZ) applicable as an electrode or oxygen membrane; and a Vanadia-Calcia stabilized Zirconia (VCSZ) applicable for the interconnect and internal gas manifolding layer of a monolithic ceramic stack.

An interconnect is a ceramic or metal material that serves as a physical barrier between oxidizing and reducing gas environments which permits the flow of electrons from one electrochemical cell to the next in series. The material should possess high electron conductivity, low oxygen ion conductivity and similar coefficient of thermal expansion relative to the electrodes and electrolyte material.

An internal gas manifolding layer is a portion of the ceramic repeat unit with open channels permitting the bulk flow of reactant gases across the active electrode surfaces. In the proposed design the manifold is ceramic material with parallel channels covering 20 to 80% of the cell area. The ceramic surrounding the channels acts as the mechanical structure for the stack and electron transfer pathway (interconnect).

A monolithic stack is a single piece ceramic produced by co-sintering of multiple repeat unit solid oxide cells. The single piece ceramic contains layers of varying local chemistry to support the individual functions necessary of the fuel cell.

These materials use low-cost earth abundant materials, Vanadia and Calcia, which have several distinct advantages when compared to typical lanthanate electrodes and metal interconnects.

The cubic defect structure of VYSZ and VCSZ are the same as YSZ ceramics. The YSZ structure is a cubic fluorite structure with 4 molecules per unit cell. The metal cations ($Zr^{+4}$, $Ca^{+2}$, $Y^{+3}$, $V^{+3}$) are randomly distributed on the metal ion sublattice while the oxygen ions and oxygen vacancies are randomly distributed on the oxygen ion sublattice. The metal ions have 8-fold coordination with the oxygen sublattice and the oxygen ions have 4-fold coordination with the metal sublattice.

Their defect-cubic structure is chemically and structurally compatible with a defect-cubic structured 8YSZ (contains 8 mol % yttria) electrolyte. The cubic defect structure of VYSZ and VCSZ are the same as YSZ ceramics. The YSZ structure is a cubic fluorite structure with 4 molecules per unit cell. The metal cations ($Zr^{+4}$, $Ca^{+2}$, $Y^{+3}$, $V^{+3}$) are randomly distributed on the metal ion sublattice while the oxygen ions and oxygen vacancies are randomly distributed on the oxygen ion sublattice. The metal ions have 8-fold coordination with the oxygen sublattice and the oxygen ions have 4-fold coordination with the metal sublattice. This reduces or eliminates degradation of the electrode diffusing into the YSZ matrix, reduces activation losses at the boundary due to dissimilar conduction pathways, and eliminates delamination risk at elevated gas pressures (e.g., 1 to 1000 bar during SOFC operation). In certain circumstances, elevated pressure is above the operating conditions of existing commercial SOFC, about 1.25 bar, to hydrogen storage pressures at 700 bar.

The VYSZ material forms $V_2O_3$ and possibly other oxides ($VO/VO_2$) on the surface and interconnected throughout the $ZrO_2$ matrix in reducing environments. These oxides facilitate carbonaceous fuels oxidizing to $CO/CO_2$ due to the abundance and mobility of surface oxygen ions, which easily volatilizes into the bulk gas stream due to thermodynamic equilibrium of the carbon species, thereby preventing coking in low steam conditions. Low steam conditions correspond to direct operation on hydrocarbons with a steam to hydrocarbon ratio below 2:1, though coking can occur at higher ratios due to local variations in flow and chemistry.

The VYSZ and VCSZ are thermodynamically and structurally stable in reducing and oxidizing environments (tested up to 750° C. by switching gas environments) which lowers the degradation rate, enables reversible solid oxide cells, and enables the burnout manufacturing method described in section B below. Thermodynamic stability also results in sulfur tolerance due to the abundance and mobility of oxygen ions on the surface and the lower thermodynamic stability of metal sulfides compared to metal oxides. The reaction potential of vanadia will not promote formation of a metal sulfide, unlike the nickel metal in current Nickel-YSZ cerment anodes which form NiS which slowly ablates away.

The mixed electronic and ionic (oxygen ion) conduction of the VYSZ electrode material increases the available reaction sites from specific triple-phase-boundary points to the entire surface area of the electrode. The nanograined (50 to 70 nm grain size) structure also increases the surface grain boundary area with decreased activation energies, which promotes increased electrochemical activity. Ionic conduction is approximately 2-3 times lower than YSZ in an oxidizing environment and 5-10 times lower in a reducing environment because the vacancy structure more closely resembles 16YSZ (contains 16 mol % yttria). This reduction is based on high levels on vanadia doping (5 to 20 mol % as $V_2O_3$). For particular applications and operating conditions, additional material and system design optimization will isolate the ideal trade-off point between electrical and ionic conductivities in reducing and oxidizing environments.

The ionic conduction facilitates electrode fabrication without pore formers that could lead to crack formation. This dense electrode strategy makes the anode layer thickness the dominant driver of repeat-unit ASR. The nanograined nature of VYSZ and VCSZ also leads to increased mechanical strength (10 times compared to μm YSZ samples) and fracture toughness as well.

VYSZ is also a suitable MEIC for pressure driven OSM using the same fabrication and modularity described in sections B and C.

The VCSZ material replaces the most expensive dopant, Yttria, with low cost Calcia. The material is also an MEIC, but with 10 to 100 times lower oxygen conductivity than YSZ. Combined with the relative layer thicknesses (sub 400 μm interconnects to 40 μm electrodes), oxygen conduction through the interconnect is minimal. In certain embodiments, the interconnects have a thickness of 10 to 1000 μm. In certain embodiments, the anode has a thickness of 1 to 30 μm. In certain embodiments, the cathode has a thickness of 1 to 30 μm. In certain embodiments, the electrolyte has a thickness of 10 to 30 μm. The defect cubic structure compatibility with the VYSZ electrodes minimizes contact resistance and prevents conventional electrolyte and electrode degradation in current systems. The electrical conductivity, lower than metal plates, contributes significantly to the ASR, and optimization of the interconnect composition and geometry is important for performance and cost.

In certain embodiments, the anode comprises at least 95 wt %, or at least 97 wt %, or at least 99 wt % VYSZ. In certain embodiments, the anode comprises at least 95 wt %, or at least 97 wt %, or at least 99 wt % VCSZ. In certain embodiments, the anode comprises at least 95 wt %, or at least 97 wt %, or at least 99 wt %, of a mixture of VYSZ and VCSZ. In certain embodiments, the anode may include other materials in addition to VYSZ and/or VCSZ. Illustrative other materials include Ni-YSZ cermet, vanadium oxide, or a combination thereof.

In certain embodiments, the cathode comprises at least 95 wt %, or at least 97 wt %, or at least 99 wt % VYSZ. In certain embodiments, the cathode comprises at least 95 wt %, or at least 97 wt %, or at least 99 wt % VCSZ. In certain embodiments, the cathode comprises at least 95 wt %, or at least 97 wt %, or at least 99 wt %, of a mixture of VYSZ and VCSZ. In certain embodiments, the cathode may include other materials in addition to VYSZ and/or VCSZ. Illustrative other materials include La- or Sr-based perovskites.

In certain embodiments, the interconnect comprises at least 95 wt %, or at least 97 wt %, or at least 99 wt % VYSZ. In certain embodiments, the interconnect comprises at least 95 wt %, or at least 97 wt %, or at least 99 wt % VCSZ. In certain embodiments, the interconnect comprises at least 95 wt %, or at least 97 wt %, or at least 99 wt %, of a mixture of VYSZ and VCSZ. In certain embodiments, the interconnects may include other materials in addition to VYSZ and/or VCSZ. Illustrative other materials include $LaCrO_3$, a metal (e.g., Pt, Au, Ag, stainless steel) or a combination thereof.

Figure 2:
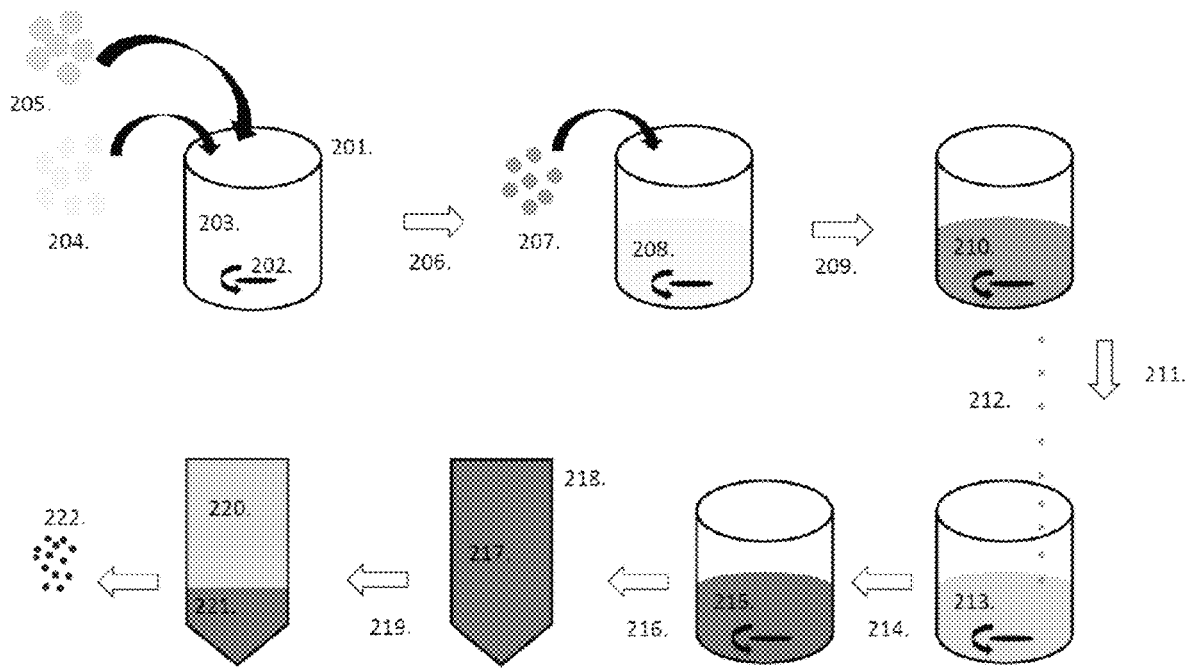
FIG. 2 illustrates the VYSZ or VCSZ synthesis technique.

FIG. 2 shows VYSZ or VCSZ synthesis as follows: 201 a beaker (borosilicate, polyethylene (PE), polytetrafluoroethylene (PTFE), glass, etc.) sized to the appropriate volume for desired amount a synthesized material is used to dissolve and store liquids and solids; 202 a PTFE coated metal stir bar spun at >100 rpm; 203 deionized or reverse osmosis water is added to the beaker in the appropriate amount for the material synthesis; 204 yttrium nitrate (4 to 15 mol % $Y_2O_3$) or calcium nitrate (8 to 20% CaO) is added to the stirring water in the appropriate amounts; 205 zirconium oxynitrate (balance mol % $ZrO_2$) is added to the water in the appropriate amounts; 206 the yttrium or calcium nitrates and the zirconium oxynitrate are left to dissolve in the water overnight to fully dissolve—zirconium oxynitrate is a high Z dielectric material and takes many hours to dissolve—vanadium oxysulfate attaches to the yttrium and calcium ions forming a complex which adversely affects the conductivity; 207 vanadium oxysulfate is added to the YSZ or CSZ solution after complete dissolution (5 to 25 mol % $VO_2$); 208 the YSZ or CSZ completely dissolved solution randomly distributed; 209 the complete precursor solution is stirred between 30 minutes to 2 hrs to dissolve the vanadium oxysulfate powder and form a dark blue solid solution; 210 dark blue VYSZ or VCSZ solution is stirred; 211 dark blue VYSZ or VCSZ solution is transferred to a gravity assisted separator funnel to be added dropwise into an ammonia solution; 212 dark blue VYSZ or VCSZ droplets fall about 0.5 m in droplets ~<1 cm in diameter and precipitate out a solution VYSZ or VCSZ hydroxide suspended in the ammonia solution; 213 a 5 M ammonium hydroxide solution (>2 M and less than 10 M) inside of a beaker (borosilicate, PE, PTFE, glass, etc.) with a PTFE coated metal stir bar spun at >100 rpm; 214 the dropping is continued until the dark blue VYSZ or VCSZ solution funnel is empty; 215 the precipitate hydroxide is spun for only a few minutes after the dark blue VYSZ or VCSZ solution funnel is empty—the precipitate hydroxide is not meant to be aged; 216 the tan-colored precipitate is transferred to a separation apparatus such as centrifuge tube; 217 tan colored precipitate is transferred to a separation apparatus such as centrifuge tube—there is no precipitate settling; 218 a high-density PE (HDPE) or high density polypropylene (HDPP) centrifuge tube is spun at 3000+ rpm; 219 the precipitate and the ammonia solution is spun to 3000+ rpm (high number of Gs) in a centrifuge or similar apparatus; 220 the supernatant is disposed of and replaced with 100% ethanol; 221 the collected VYSZ or VCSZ hydroxide is remixed with the added ethanol and stirred together such that it looks like 217; and then is repeated 3 more times. The total number of centrifuges is 4 (3 with ethanol and 1 with the original ammonia solution). 222: Collected VYSZ or VCSZ hydroxide is heated at 450 to 650° C. in air for a duration >2 hrs to remove water, $NO_2$ gaseous byproducts, and crystallize the powder and then heated at 800 to 1000° C. under a reducing environment (~10% H$_2$/N$_2$) to remove SO$_2$ gaseous byproducts for >2 hrs. After heat treatment at 1000°, the average particle size is 20 to 25 nm.

The procedure shown and described in FIG. 2 may be used to make nanocrystalline powder YSZ, VYSC, VCSZ or CSZ after completing all synthesis and heat treatment steps. This is the powder used for stack manufacture. The powder is a solid solution nanopowder with an average particle size of 20 to 25 nm. The powder is sieved through a ~25 µm to 125 µm square mesh so the powder has the consistency of fine sand and feels like sand. The powder is very fluffy and aerosolizes easily so handling the powder in a negative pressure vessel is recommended (fumehood). The chemical composition is a(VO$_x$)-b(Y$_2$O$_3$)-c(CaO)-d(ZrO$_2$)$_{(ss)}$ where a+b+c+d=1. All powders have the cubic defect structure and compositions with a≥0.1 have between 1 to 4 wt % V$_2$O$_3$ as a secondary phase. The VYSZ/VCSZ powders can range in color from yellow, green, to a dark blue. The powders have good water adsorption >1 wt %. The powders have high temperature stability up to 600° C. in air and >1350° C. in H$_2$/N$_2$. The powder has poor electrical conductivity and readily sticks to most surfaces.

An alternative nanocrystalline powder synthesis method is a Pechini method. All metal ions are dissolved in water. Citric acid is added to the metal ion solution and mixed. A chelating agent such as ethylene glycol is added to the metal ion and citric acid solution. A gel is formed. The gel is heated to ~120° C. to burn of the water and some of the polymer. The residual is ground in a mortar and pestle and heated up to 600 to 1000° C. to burn away any remaining polymers and oxidize the powders.

Another alternative nanocrystalline powder synthesis method is a hydrothermal method. A metal ion solution is placed inside of a stainless-steel pressure vessel and heated to ~300° C. with autogenous water vapor pressure. The pressure vessel is cooled and the powder is recovered and heated to 400 to 700° C. to oxidize the powder.

A further alternative nanocrystalline powder synthesis method is a high temperature method. Place ZrO$_2$, Y$_2$O$_3$, and V$_2$O$_5$ and heat to 1200+C in H$_2$ for 1 to 24 hrs and cool down in a noble metal crucible (Ir, Pt—Rh, W). The powders will interdiffuse forming a single phase.

B. Stack Fabrication

The manufacturing process for these materials—replacing standard tape-casting, screen printing, and thermal spraying—consists of the following steps: (i) synthesizing ultra-fine nano-powders, 20-25 nanometers, clusters of which are sieved through a 25 by 25 micron square particle mesh in tiny mass increments; (ii) dry powder pressing of repeat-units (interconnect, anode, electrolyte, cathode) with embedded burnout material (nylon, cellulose fiber or cardstock, PTFE, etc) to form gas channels; (iii) cold-isostatic pressing above 45,000 psi; (iv) co-sintering of the all-ceramic stack (1200° C.) in reducing gas environments; and (v) ceramic casting of a non-porous gas manifold without compression or glass seals.

The near theoretically small grain sizes of the nano powders have several distinct advantages to include: (1) facilitating thinner gas-tight electrolyte and electrode layers, e.g. denser particle packing with dry fabrication; (2) facilitating thin interconnect layers to minimize repeat unit thickness and ASR; (3) higher oxygen ion conductivity due to additional grain intersection reaction sites (grain boundaries) and improved ion flow along the additional and excessive number grain boundaries through the electrolyte; (4) lower temperature sintering, i.e., 1200 to 1250° C. for the entire ceramic stack in one furnace ramping step, reducing cost and processing time where all layers are gas tight; (5) smaller nanograins self-heal and require a longer initial crack for the crack to become stable and propagate; (6) the nanopowder bonds well to itself requiring smaller and cheaper pressing equipment while maintaining structural integrity throughout the processing; and (7) the gas routing ceramic interconnect layer serves the dual purpose of conducting electrons directly to the next cell without current collecting meshes or metal plates and routing reactant gases across the electrodes.

FIGS. 3A-3C represent a 400 W monolithic stack assembly of four 30-cell micro-stacks, that are bagged and cold isostatic press-(CIP)ed together to form a single unit. Different burnout materials can tailor the gas channel geometry. Illustrative burnout materials include a carbon-based polymer, graphite flake, low temperature melting metal, and any type of paper. The height of the gas channels is a large driver of performance and cost Smaller channels result in a thinner interconnects, which reduces ASR and reduces the material cost per repeat unit.

An oxidant gas channel 301 is adjacent to an oxygen electrode 302. In certain embodiments, the oxygen electrode 302 comprises or consists of VYSZ. An electrolyte 303 is interposed between the oxygen electrode 302 and a fuel electrode 304. In certain embodiments, the electrolyte 303 comprises or consists of YSZ. In certain embodiments, the fuel electrode 304 comprises or consists of VYSZ. A fuel gas channel 305 is adjacent to the fuel electrode 304. An interconnect 306 is located between adjacent cell repeat-units 307. In certain embodiments, the interconnect 306 comprises or consists of VCSZ. FIG. 3B depicts a short stack 308 of cell repeat units 307. FIG. 3C shows a tower 309 of multiple co-sintered short stacks that are encased within a casted manifold 310.

The limiting factor for the channel size is the pressure drop along the channel length. Assuming a current density of 0.35 A/cm2, the local Reynolds number is <10 for both the air and fuel sides at pressures between 1 bar and 50 bar absolute, thus fully developed laminar flow can be assumed and the analytic solution (1) is highly accurate:

$$\Delta P = \frac{4\overline{V}\mu L}{c^2}\left(\frac{1}{3} - \frac{64}{\pi^5}\cdot\frac{c}{b}\tanh\left(\frac{\pi\cdot b}{2c}\right)\right) \quad (1)$$

Variables b and c represent the height and width of the channels. At high operating pressures, >20 bar, it is feasible to shrink the channels, and thus the interconnect thickness to increase the volumetric power density of the system. In certain embodiments, the oxidant channels and the fuel channels have a width of 500 to 1000 µm and a height of 10 to 250 µm.

The same design and manufacturing process is applicable for OSM applications by replacing the combined anode/electrolyte/cathode layers of a SOFC stack with a single MEIC membrane layer. For example, an OSM embodiment may be the same as shown in FIGS. 3A-3C except that the electrolyte is replaced with a VYSZ material, and the interconnect can be any material. Similarly, an all-ceramic heat exchanger is manufactured by omitting the MEIC layers and pressing and sintering non-conductive ceramic with embedded burnout material to form gas channels. Illustrative non-conductive ceramic materials include beryllium oxide, yttria stabilized zirconia, aluminum oxide, aluminosilicate, magnesium silicate, or a mixed combination thereof.

Figure 4A:
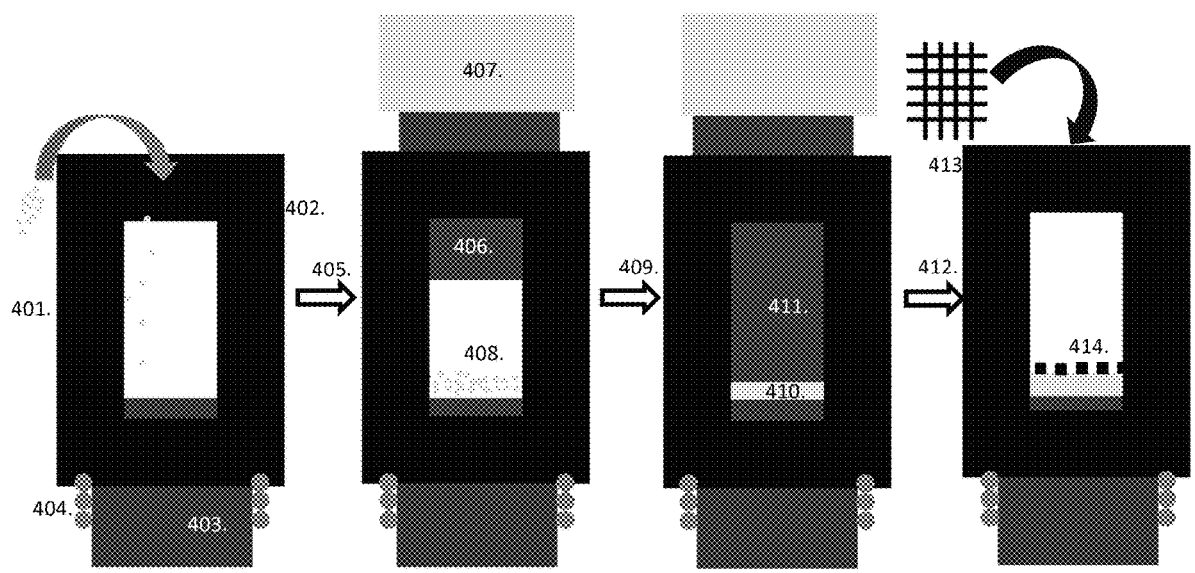
FIGS. 4A-4D illustrate the stack manufacturing process.
Figure 4B:
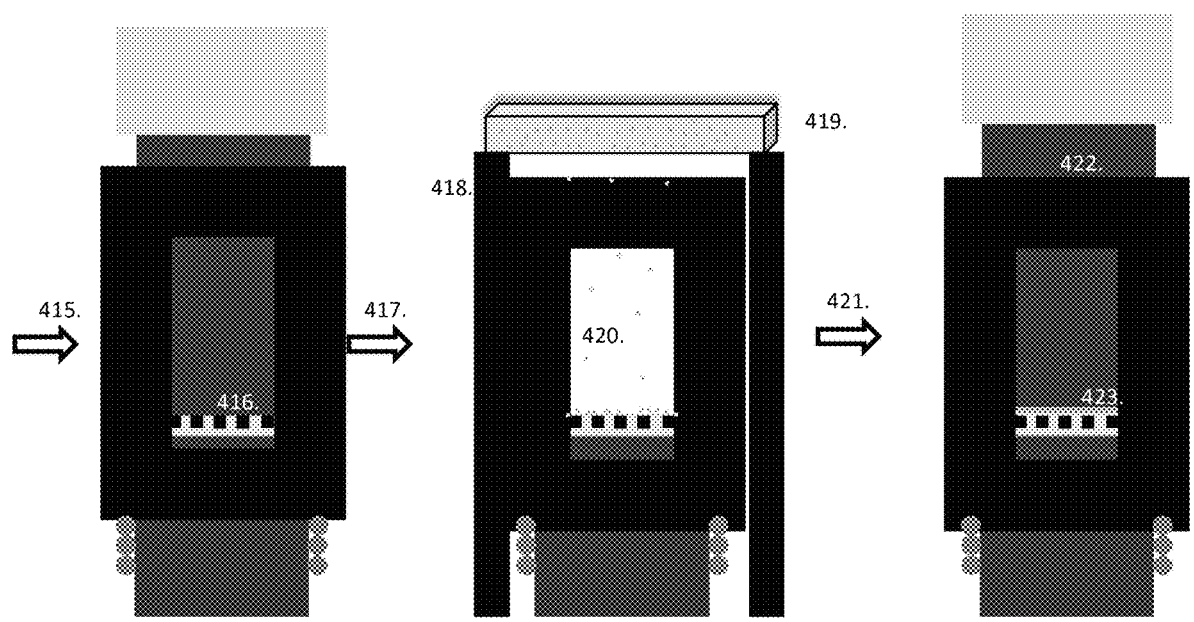

One embodiment is shown in FIGS. 4A-4D. In FIG. 4A VCSZ nanopowder 401 is dropped evenly into a die 402 (carbon steel, stainless steel, or tungsten carbide) (square cross section is preferred) with a <5 degree taper on the top of the die to aid in sample ejection/removal. A metal or polymer plunger 403 (carbon steel, stainless steel, tungsten carbide, PE, polypropylene (PP), or PTFE) that is longer than the die is placed into the die about ⅛ to ¼ the length of the die. The die is held up using multiple O-rings 404, held snugly around the plunger. In step 405 the nanopowder is shaken using a vibration table to level the VCSZ nanopowder. A top plunger 406 is inserted into the die. A hydraulic ram or press 407 is placed on top of the top plunger. The VCSZ nanopowder 408 is leveled before the top plunger comes into contact with it. In step 409 the ram is lowered and pressed to a low pressure <100 MPa. The nanopowder presses together to create a compressed pellet layer 410 that is mechanically stable if the die was removed, with thickness >0.2 mm and <5 mm per repeat unit. The top plunger (now shown as 411) moves down to touch the nanopowder—the die is dual action so both plungers move slightly under the application of pressure which minimizes density gradients. In step 412 the pressure of the hydraulic ram is slowly removed and the plunger is slowly pulled out of the die leaving the VCSZ pellet exposed on the top. A square mesh 413 made out of a compressible material (nylon, cellulose fiber or cardstock, PTFE, etc.)—the individual strands span the die in one direction and are ~0.1 in short on the other side—strand width >0.1 mm and 0.1 mm and <5 mm—crosslinking should be at a minimum and form squares—30 to 50% open area to 50 to 70% mesh material is desired. The mesh (now shown as 414) is laid on top of the VCSZ pressed layer; Referring to FIG. 4B, in step 415 the top plunger is reinserted and the mesh is pressed into the VCSZ layer below using a force greater than in step 409 but lower than 200 MPa. As shown by 416 the mesh and pressed VCSZ nanopowder are at the same height in the die. In step 417 the top plunger is removed from the die. As shown by 418 a circular support (PVC or metal) is placed around the die—both the die and circular support are placed on a solid surface (e.g., a concrete floor). A 25 to 125 μm square opening sieve 419 is placed on the support and the VYSZ electrode nanopowder is evenly added to the sieve. As shown by 420 a polymer plate is placed on top of the sieve and a metal weight is dropped from a specified height repeatedly—the accumulated powder per tap represents a final product layer thickness based on the mass deposited and final ceramic density; to ensure even coverage, small mesh diameters that ensure at least 4 taps to produce even layers less than 10 μm; partial mesh rotation between taps improves uniform coverage—this manual process of 418-420 of depositing a thin layer can be automated for bulk manufacturing. In step 421 the tapped VYSZ electrode layer is compressed flat. As shown by 422, the plunger is reinserted into the die. As shown by 423, the plunger compresses the accumulated powder layers to a low pressure <100 MPa to adhere the layer of VYSZ to the mesh/VCSZ layer and make it mechanically sound; and the plunger is released and the next tap layer begins.

Figure 4C:
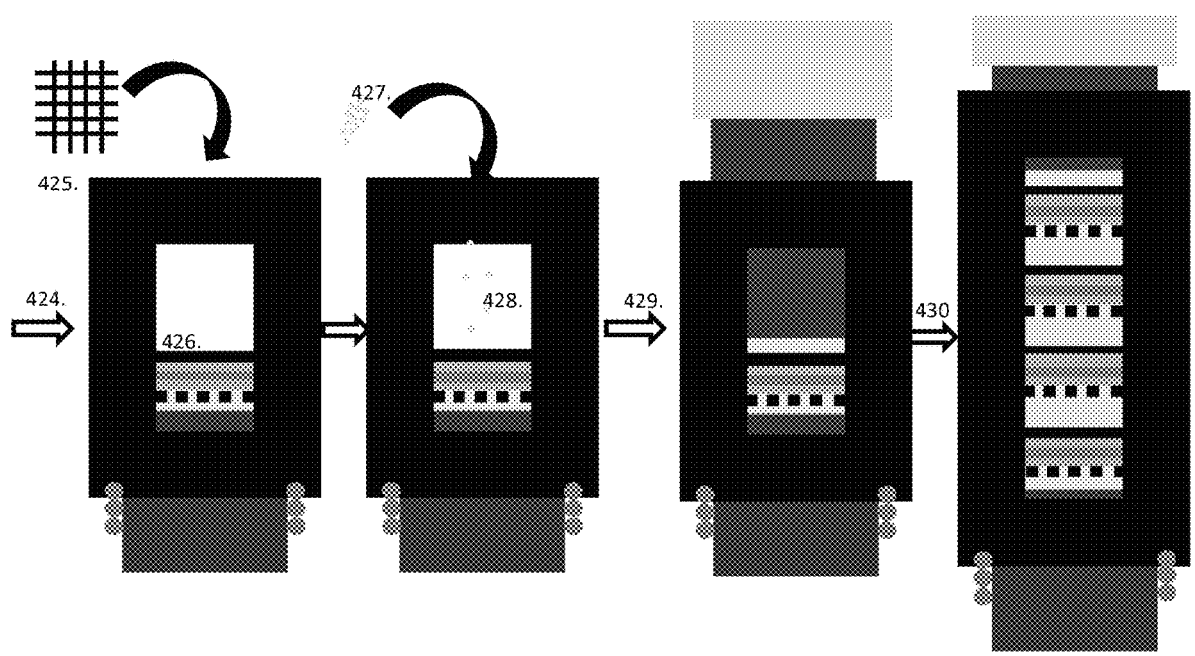

Referring to FIG. 4C, in 424 the process of 418-424 is repeated until there are three thin layers: VYSZ electrode/YSZ electrolyte/VYSZ electrode. Mesh 425 (which the same as mesh 413 but rotated 90 degrees) is laid on top of the electrode layer as shown by 426. VCSZ nanopowder 427 is placed around mesh 425. The VCSZ nanopowder is shaken using a vibration table to level the nanopowder as shown by 428. In step 429 the top plunger is reinserted and the mesh is pressed into the VCSZ layer using a force greater than in 423 but lower than 300 MPa. The VCSZ nanopowder sticks up above 426. The resulting product is one repeat unit. As shown in 430, the process of 410-429 is repeated until the desired number of cells are stacked vertically.

Figure 4D:
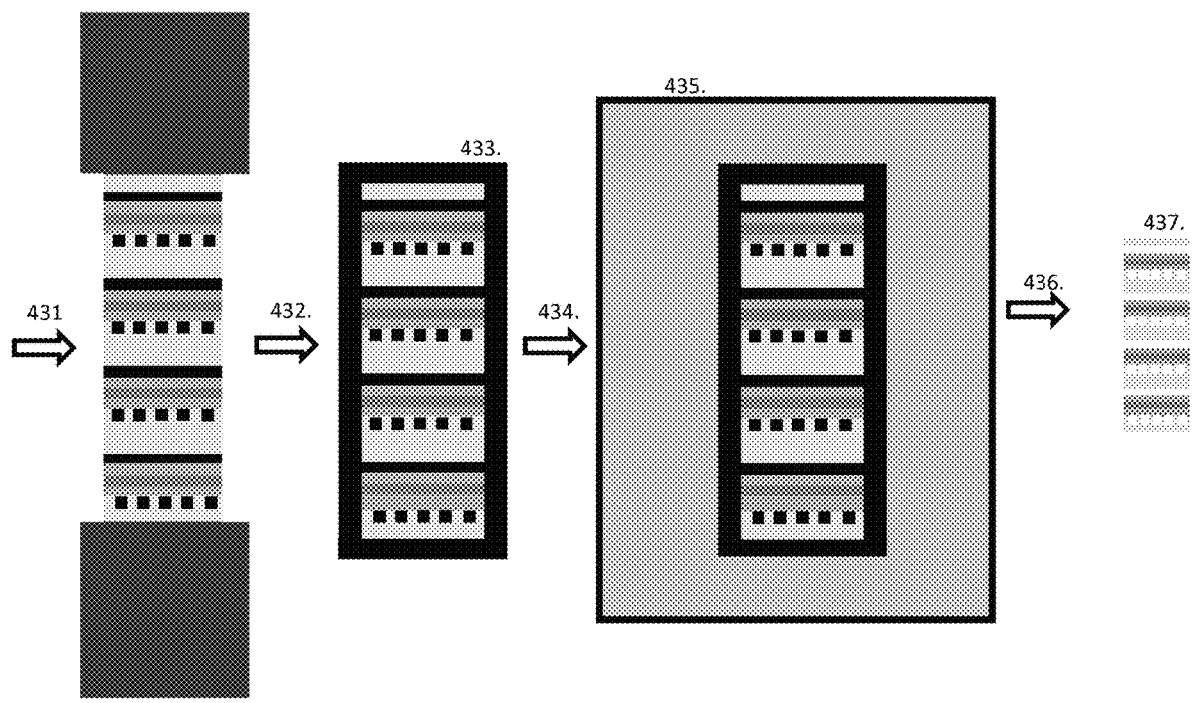

Referring to FIG. 4D, in step 431 the die is pushed down allowing the stack to be pushed out through the taper side to minimize strain on stack ejection to ensure the stack remains in one piece while the top plunger rests on top of the stack with the die removed. In step 432 the stack is removed from the two plungers and is placed in a furnace >100° C. and <200° C. to burn out the adsorbed water while not burning out the mesh materials. The burned-out stack is placed in a dry environment (<100 ppm water vapor) (e.g, glovebox). As shown by 433, the stack is encased in a polyethylene/nylon bag of sufficient thickness (>10 mils) and sealed under vacuum (<100 mTorr). In step 434 the bagged stack is transported out of the glovebox to a cold isostatic press (CIP). As shown by 435, the bagged stack is placed inside of the CIP filled with water/ethylene glycol or a non-reacting oil. The fill liquid is compressed to a pressure of 45,000<P<200,000 psi and held between 30 minutes to 2+ hours to compress the stack to smaller dimensions with unstable pores. In step 436 the CIPed stack is removed from the CIP at a reduced size. In certain embodiments, the stack will decrease 5 to 20% in size in each direction. The bagged stack is placed inside of a furnace with air or oxygen flowing and heated to 250 to 400° C. for 2+ hrs heating at 2 to 10° C./min where the bag burns away and the mesh materials burns away as well. The stack is then heated, without prior cooling, to 1150° C. to 1400° C. with a 5 to 10% $H_2/N_2$ gas environment heating at 2 to 10° C./min—this sintering temperature is held for a few hours before the stack is cooled down further—individual layers of the stack VYSZ/VCSZ or YSZ should be >94% dense and be gas tight/impermeable—after cooling. Each individual layer should be greater than >94% dense. In other words, <6% of pores in each layer. Percentage density is calculated by measuring the area and thicknesses of each layer (anode, cathode, electrolyte, interconnect) and determining a volume fraction of each layer. Using the chemistry of each layer, a theoretical density can be calculated. Then the average density can be calculated from density=sum of (density of each layer)*(volume fraction of each layer). The stack density can be calculated from water Archimedes technique. Then percentage density=(Archimedes density)/(Average density). As shown by 437, the stack is complete with open pore channels and is ready for power/hydrogen/oxygen generation.

In certain embodiments, the stack may have 10 to 1000 cells. Below 10 cells, the power will be low and manufacturing the stack would be difficult. More than 1000 cells, keeping the stack electrically isolated from earth ground would be difficult.

In certain embodiments, there may be a post-sintering process. After sintering, the stack needs may be ground plane parallel on the two electrode sides (top and bottom) using diamond, SiC, BC, WC, and/or $Si_3N_4$ sanding devices with water cooling. The final roughness should be rougher than 200 grit so that a metallic paste can be applied to form the two metallic electrodes attached with voltage and current sensing wires. At least 10 to 1000 um needs to be removed. The four walls also need to be ground using diamond, SiC, BC, WC, and/or $Si_3N_4$ sanding devices with water cooling. The walls should form a square when viewed from top/bottom electrode. Material must be removed to reveal the flow channels but not so much as to reveal the cross flow channels. This should be 10 to 100 um. The final roughness should be rougher than 200 grit so that the zirconia ceramic manifold can adhere and form a gas tight layer. The corners can be rounded but is not required.

Alternative fabrication methods include tape casting, extrusion and screen printing. Tape casting would involve ceramic printing of a single repeat unit over a wide area usually 1 m×100 m. Thin squares are cut out and co-sintered. Tape casting is workable for making a single cell, but not for making stacks. Extrusion would involve forcing ceramic with a binder through a mandrel forming the desired green shape (which can be closed at the leading end). Screen printing would be similar to tape casting but using a printer instead of a slurry with a wedge.

C. System Construction

Figure 5:
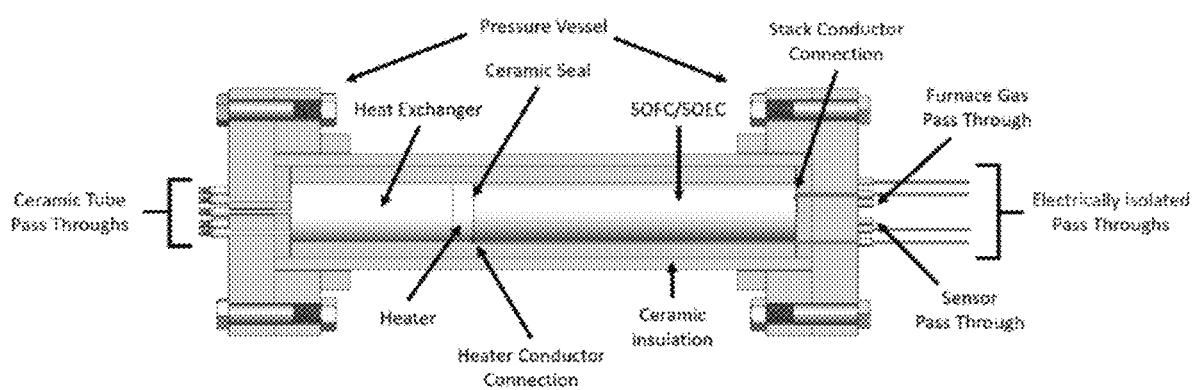
FIG. 5 illustrates pressurized hotbox module for integration with low temperature balance-of-plant equipment.

The advantages of the material and stack production method are realized when integrated in systems designed for pressurized operation. The synergies compound in several ways depending upon the system arrangement. Pressurization allows for smaller gas microchannels, reducing the material cost, improving ASR, and increasing volumetric and gravimetric power density. A pressurized hotbox module design, FIG. 5, complements the material and manufacturing innovations of the VYSZ ion stack by integrating the VYSZ ion stack into one of several flexible system configurations: (i) an air pressurized SOFC cycle, (ii) a decoupled variant using an oxygen membrane system, (iii) a compact high pressure power unit, and (iv) a high pressure, closed-loop, reversible energy storage system. YSZ, VYSZ and VCSZ components are present in the SOFC as described above. Illustrative materials for the pressure vessel include aluminum alloy, titanium alloy, stainless alloy, and nickel super alloy. Illustrative materials for the ceramic insulation include alumina or aluminosilicate fiber. Illustrative material for the seals include rubber (e.g., Viton® rubber), polytetrafluoroethylene (e.g., Teflon®) o-rings or graphite o-rings. The heat exchanger may be, for example, shell-and-tube, plate-and-tube, and/or cross flow plates. The heat exchanger is used to recycle the waste heat from the exhaust gases to preheat the incoming gases. This minimizes or eliminates the need to use a preheater on the incoming gases.

The foundation of each system is a set of hotbox modules each containing a heat exchanger and stack. A start-up heating element will also be included within the hotbox where external pre-heating is insufficient Smaller mass-produced modules lower cost and enable greater flexibility and reliability in operation. The heat exchanger length can be tailored to the system configuration and operating requirements. Individual modules connect to the air and fuel systems via four low temperature gas fittings at the cold-end of the hotbox, and the power electronics and controls connect to a few electrical and sensor connections at the hot-end. Oxidant and fuel gases are routed in part by cast ceramic non-porous manifold around the monolithic ceramic stack, without need for compression or glass seals.

Figure 6:
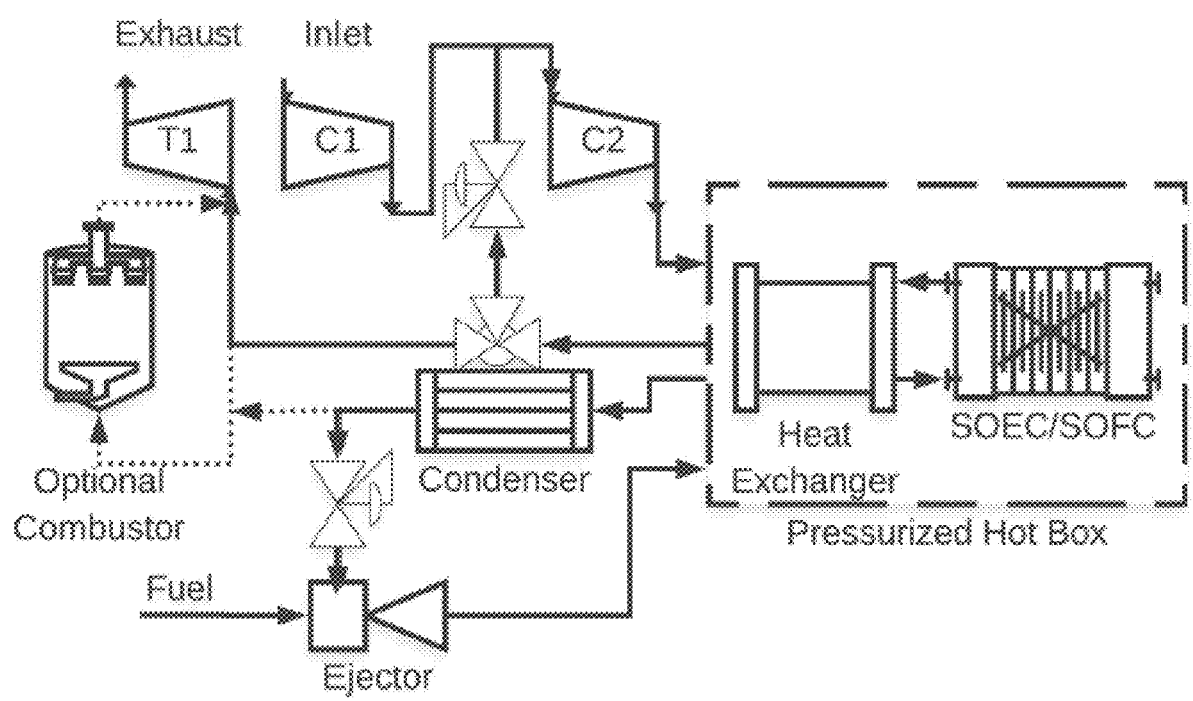
FIG. 6 shows a dual turbo, air pressurized SOFC power system.

Systems operating with air require some means of air compression, such as the simple two-stage turbo or scroll compression shown in FIG. 6. Recirculation to manage the operating temperature in this design is controlled by a motor driven high pressure compressor, C2. The additional pressure provided by C2 ensures the turbine, T1, can spool up the air flow through the first compressor, C1. Operating on hydrogen, the closed-loop fuel side need only remove condensed water and can achieve near 100% fuel utilization. Operating on hydrocarbon fuels, the utilization is less than 100% and a small combustor can increase the power recovery of T1. Carbon fiber or Kevlar wrapping of the ceramic stack manifold and insulation reduce weight for specific applications, resulting in lightweight power systems on the order of 2-4 kW/kg.

Figure 7:
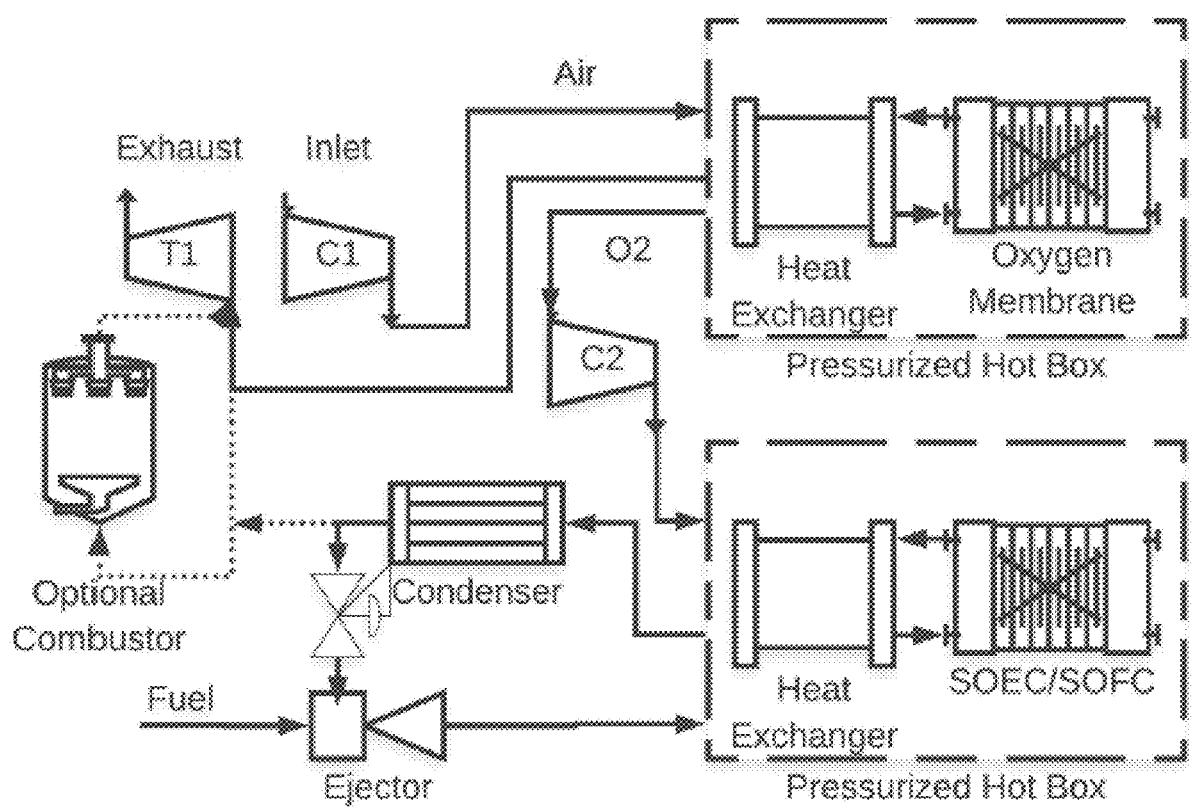
FIG. 7 shows a de-coupled hybrid SOFC power system for shore or shipboard power.

A variant on this pressurized system, FIG. 7, includes an OSM used to decouple the thermal dynamics of the turbo-compressor and fuel cell sub-systems. The hotbox module and VYSZ material is applicable for both the fuel cell and oxygen membrane components of this de-coupled hybrid system.

Figure 8:
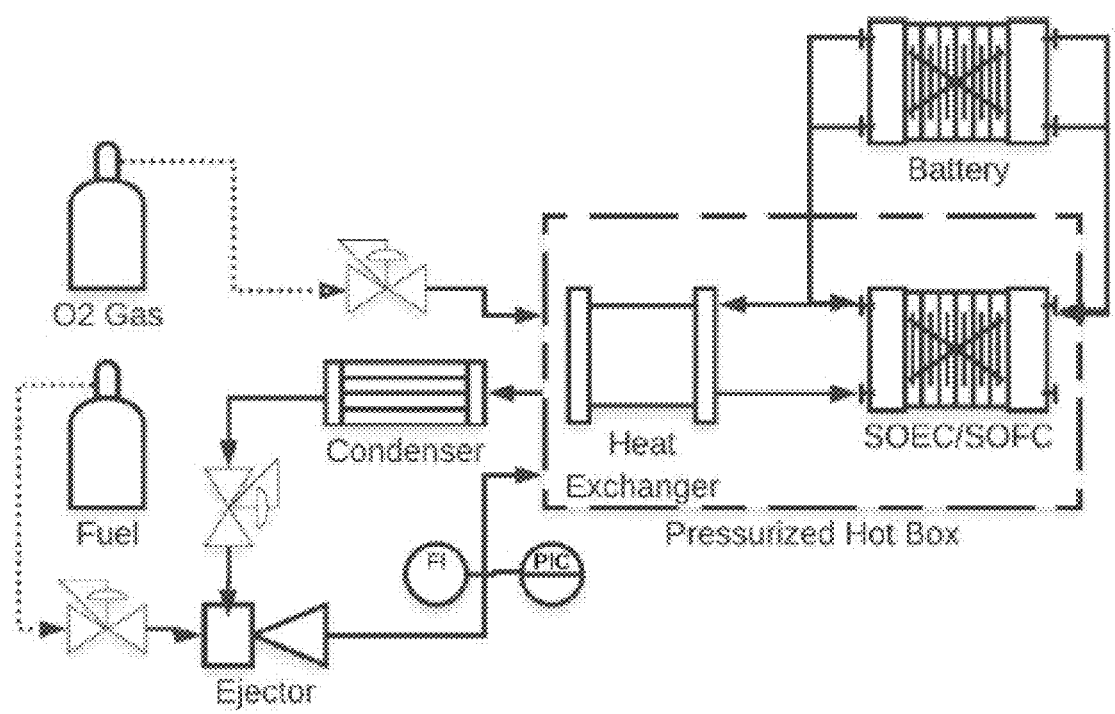
FIG. 8 shows a compact balance-of-plant for a closed-loop SOFC-battery hybrid.

Space or undersea applications lack access to the abundant oxidant source of surface or airborne systems. Capturing both the product hydrogen and oxygen from a pressurized electrolysis system can charge storage tanks for use later in fuel cell operation. The closed-loop SOFC-battery hybrid system shown in FIG. 8 provides flexibility to support multiple platforms. Replacing the pump and natural gas line supplying the modular SOFC hotbox with a set of pressurized fuel and oxidant tanks that drive system recirculation using solid-state ejectors, results in a closed loop system with high efficiency, high volumetric and gravimetric energy density, and no moving parts.

Figure 9:
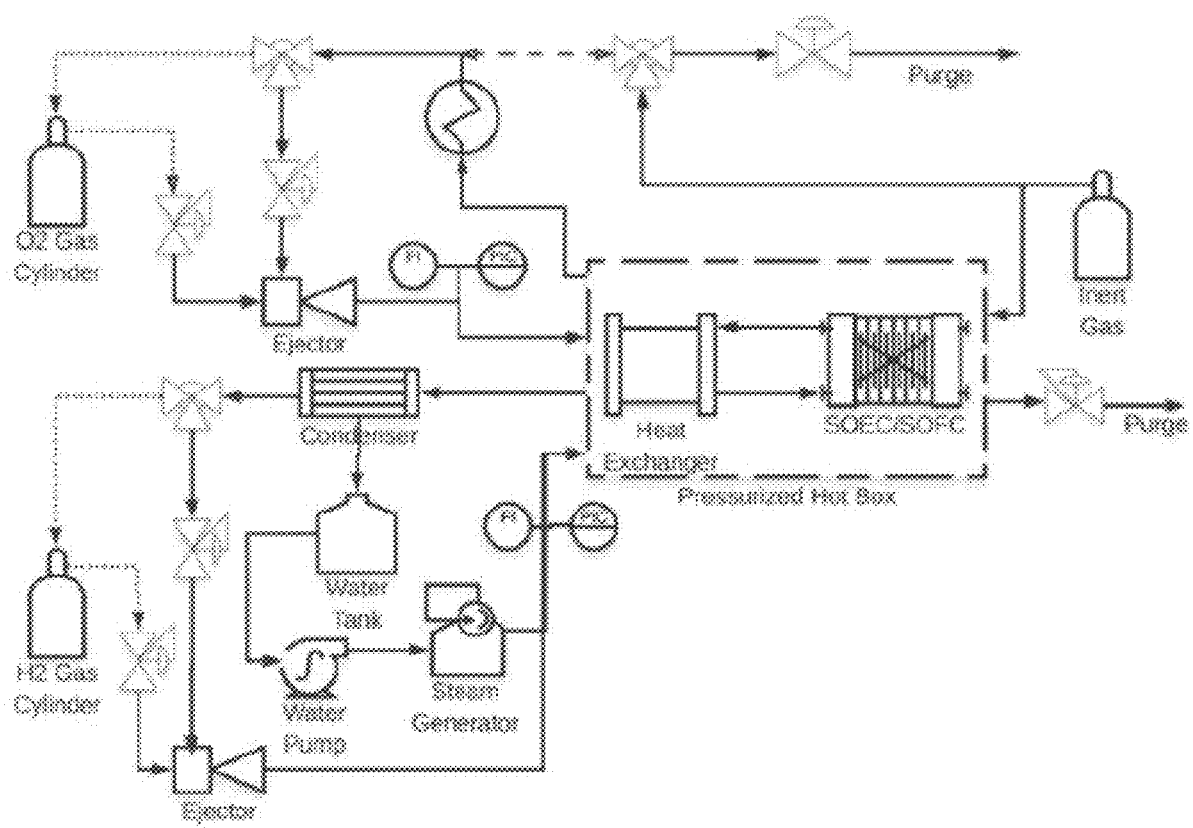
FIG. 9 shows a balance-of-plant design for a closed loop reversible fuel cell energy storage solution.

The few additional valves and a water pump shown in FIG. 9, enable operation in both fuel cell and electrolysis modes.

The balance-of-plant designs of prior SOFC systems limited modularity, requiring bespoke systems development for every platform application. Ensuring even distribution of air for cooling to all parts of the stack made small re-designs difficult. The oxygen fed hotbox module shown in FIGS. 7, 8 and 9 makes distributing the correct oxidant to each cell a passive control. As oxygen is consumed the local pressure drops, and fresh oxygen supply flows directly where it is needed. The interconnected gas manifolding on the oxidant side of the electrolyte shown in FIG. 3 ensures that as oxygen ions cross the membrane to the fuel side, pressure will equalize throughout the oxygen side of the stack, i.e. no portion of the cell will become de-activated due to a lack of oxygen supply. This passive design allows individual modules to be added or removed from the system by connecting a few gas, electrical and sensor fittings.

Figure 11:
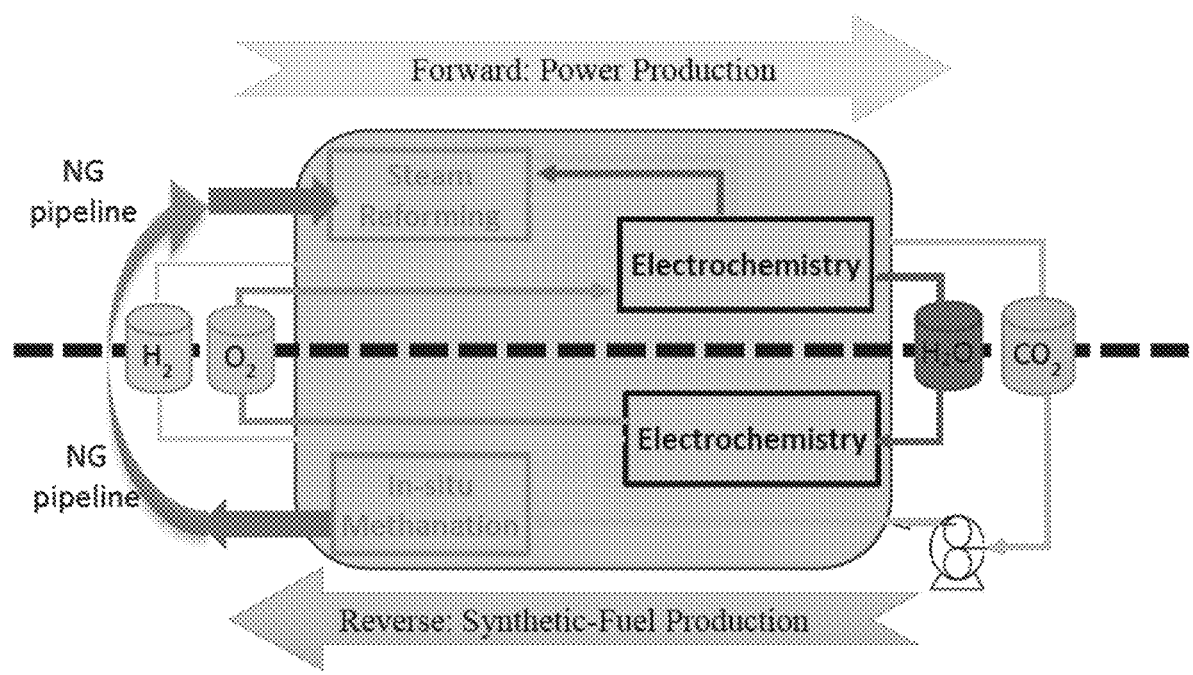
FIG. 11 illustrates a reversible system.

With a heat exchanger tolerant of supercritical steam, such as ceramic or Monel, the reversible system shown in FIG. 11 operates as an electrolyzer at 8-30 MPa. This avoids expensive and inefficient hydrogen compression by replacing the hydrogen compressor with a standard liquid water pump, saving 10-15% of the energy consumption of hydrogen production. The roundtrip efficiency of a closed loop pressurized reversible fuel cell system becomes comparable to batteries, but with higher energy storage densities and no long-term storage losses.

Figure 10:
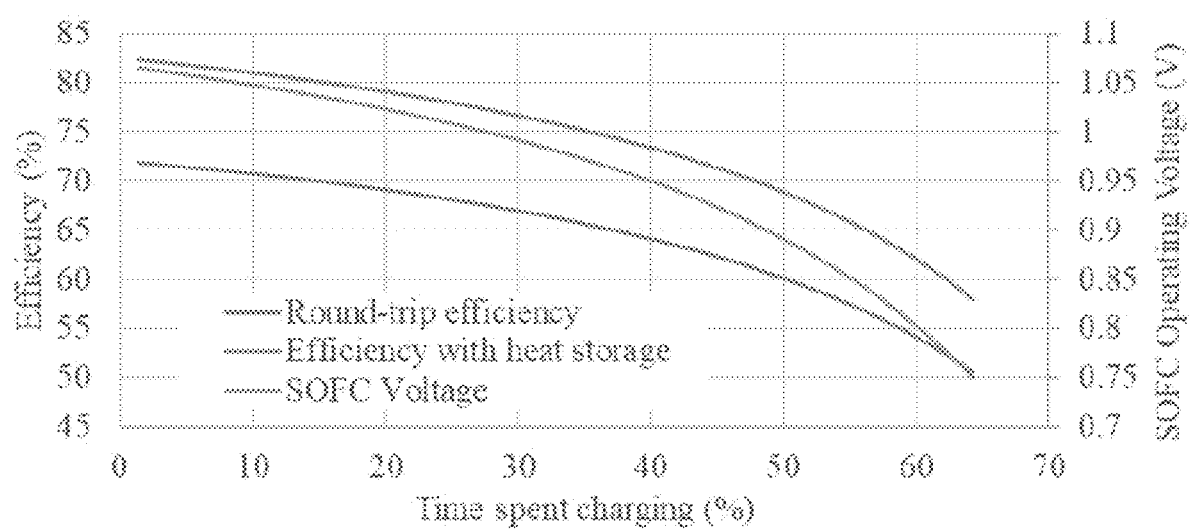
FIG. 10 shows round-trip efficiency of a closed-loop reversible pressurized solid oxide fuel cell. High power charging and low power discharging results in efficiencies in excess of 70%.

FIG. 10 illustrates the efficiency potential as a function of the time spent charging. Faster charging batteries are generally less efficient because of the thermal management required. The waste heat is a benefit to high temperature electrolysis, with charging at the thermoneutral voltage resulting in the highest hydrogen production efficiency. Operating electrolysis at the tank storage pressure, a fueling station would avoid storing any quantity of pressurized hydrogen.

Assuming balanced production/consumption of hydrogen, the average round-trip efficiency depends on the resulting ratio of time operating in each mode. An even-split of SOEC and SOFC operation results in approximately 60% round-trip efficiency. Operating as a large controllable load for 15% of the time, e.g. during renewable energy curtailment periods, and a small generator the remaining 85% of the time, can drive roundtrip energy storage efficiency up to 70%. Unlike batteries, gaseous storage efficiency is independent of the storage duration. By operating at pressure, the round-trip energy storage efficiency is improved. Efficiency can be further improved by capturing and re-using the oxygen. Prior SOFC technologies would degrade faster using pure O2 gas flowing over the cathodes. The integration with existing infrastructure is improved by the proposed technology if it can in-situ produce methane for direct compatibility with natural gas pipelines and storage systems.

A separate pathway to grid-scale energy storage with reversible fuel cells utilizes the existing natural gas pipeline infrastructure and storage capacity. Fuel cell operation between five and ten bar benefits from a Nernst voltage boost, but is low enough that steam reforming still converts most methane to the hydrogen and carbon monoxide. At 150 bar the reaction reverses and co-electrolysis of steam and carbon dioxide in a 2:1 ratio results in an equilibrium exit gas composition of 62.5% $CH_4$, 12.5% CO, 5% Hz, and 20% $H_2O$. After dehumidification, this renewable natural gas is pipeline ready. The ability to operate at elevated pressure enables the synthesis of methane which is chemically unfavorable at lower pressures. The chemical and mechanical stability of VCSZ and VYSZ with YSZ allow for elevated pressure operation.

Closed-loop co-electrolysis does require a high temperature gas compressor, e.g. ceramic screw compressor, to reach the electrolysis pressurize from the 800 psi storage pressure without passing through the solid phase conditions.

Typical fuel cell/electrolyzer stacks operate with an oxidizing side (air) and a reducing side (fuel). It is possible to operate a pressurized system with high pressure steam and hydrogen on one side and low pressure steam and hydrogen on the other. Electric potential across a solid oxide cell can be used to drive oxygen from the high pressure steam to react with the low pressure hydrogen. In effect this transference of oxygen pumps hydrogen to a higher pressure despite no physical transference of hydrogen.

Applications for this modular pressurized hotbox include a variety of pressurized electrochemical systems enabled by new chemistry and stack design, such as: (1) a standard SOFC topping cycle with a turbine, scroll or reciprocating engine; (2) a SOFC topping cycle without combustion of anode off-gas by using near 100% H2 or venting unused fuel; (3) a decoupled hybrid engine using an oxygen membrane system; (4) a high pressure electrolysis system; (5) a closed loop reversible energy storage system storing hydrogen; (6) a closed loop reversible energy storage system storing renewable natural gas; (7) an electrochemical hydrogen pump applicable for solid-state hydrogen liquefaction.

Several embodiments are described below in the numbered paragraphs:

1. A multi-purpose hotbox module comprising:
a core ceramic stack comprising a plurality of yttria-stabilized zirconia electrolyte layers, interleaved with a plurality of mixed electronic and ionic conductor (MEIC) electrodes, and a plurality of MEIC interconnects, wherein the MEIC is a cubic defect structured ceramic;
a gas manifold containing the core ceramic stack;
a heat exchanger coupled to the core ceramic stack;
a pressure vessel containing the gas manifold, ceramic stack, and heat exchanger; and
a plurality of conduits through the pressure vessel comprising a plurality of insulated electrical connections and a plurality of passages for one or more of the group including fuel, gas, and instrumentation.

2. The device of paragraph 1, wherein the core ceramic stack further comprises a plurality of oxidizing gas channels separated from a plurality of reducing gas channels by the interconnects.

3. The device of paragraph 1, wherein the MEIC is one or more of the group including vanadia-yttria stabilized zirconia (VYSZ) and vanadia-calcia stabilized zirconia (VCSZ).

4. An MEIC composition VYSZ comprising:
a zirconia doped with vanadia and yttria.

5. The composition of paragraph 4 synthesized as a nano-powder with largest dimension less than 10 nanometers.

6. An MEIC composition VCSZ, comprising:
a zirconia doped with vanadia and calcia.

7. The composition of paragraph 6 synthesized as a nano-powder with largest dimension less than 10 nanometers.

8. A dry powder, vertical fabrication method for heat exchanger stacks, comprising:
first pressing ceramic powder in a plurality of layers interleaved with a plurality of
layers of burnout material;
second pressing the stack; and
sintering the stack.

9. A dry powder, vertical fabrication method for partial-pressure oxygen separator stacks, comprising:
first pressing MEIC ceramic powder in a plurality of layers interleaved with a plurality of layers of burnout material;
second pressing the stack; and
sintering the stack.

10. A dry powder, vertical fabrication method for fuel cell stacks, comprising:
first pressing ceramic powder in a plurality of layers of interconnects, MEIC anodes, electrolytes, and MEIC cathodes;
interleaving layers with embedded burnout material;
second pressing the stack; and
sintering the stack.

Although the description here contains many details, these should not be construed as limiting the scope of the disclosure but as merely providing illustrations of some of the presently preferred embodiments. Therefore, the scope of the disclosure encompasses other embodiments which may become obvious to those skilled in the art.

In these claims, reference to an element in the singular is not intended to mean "one and only one" unless explicitly stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element is to be construed as a "means plus function" element unless the element is expressly recited using the phrase "means for . . . ." No claim element is to be construed as a "step plus function" element unless the element is expressly recited using the phrase "step for . . . ."

In view of the many possible embodiments to which the principles of the disclosed invention may be applied, it should be recognized that the illustrated embodiments are only preferred examples of the invention and should not be taken as limiting the scope of the invention.

What is claimed is:

1. A composition comprising a zirconia doped only with vanadia and yttria, wherein the composition is a mixed electronic and ionic conductor and the vanadia is present in an amount of 5-20 mol %.

2. The composition of claim 1, wherein the composition is a powder with largest dimension less than 25 nanometers.

3. The composition of claim 1, wherein the composition is a powder with an average particle size of 20 to 25 nm.

4. The composition of claim 1, wherein the composition has a cubic fluorite structure with 4 molecules per unit cell and having metal cations randomly distributed on a metal ion sublattice and oxygen ions and oxygen vacancies randomly distributed on an oxygen ion sublattice.

5. The composition of claim 4, wherein the metal cations are $Zr^{+4}$, $Y^{+3}$, and $V^{+3}$.

6. A composition consisting essentially of a zirconia doped with vanadia and yttria, wherein the composition is a mixed electronic and ionic conductor and the vanadia is present in an amount of 5-20 mol %.

7. The composition of claim 6, wherein the composition has a cubic fluorite structure with 4 molecules per unit cell and having metal cations randomly distributed on a metal ion sublattice and oxygen ions and oxygen vacancies randomly distributed on an oxygen ion sublattice.

8. The composition of claim 7, wherein the metal cations are $Zr^{+4}$, $Y^{+3}$, and $V^{+3}$.

9. A composition consisting of a zirconia doped with vanadia and yttria, wherein the composition is a mixed electronic and ionic conductor and the vanadia is present in an amount of 5-20 mol %.

10. The composition of claim 9, wherein the composition has a cubic fluorite structure with 4 molecules per unit cell and having metal cations randomly distributed on a metal ion sublattice and oxygen ions and oxygen vacancies randomly distributed on an oxygen ion sublattice.

11. The composition of claim 10, wherein the metal cations are $Zr^{+4}$, $Y^{+3}$, and $V^{+3}$.

* * * * *